(12) United States Patent
Peruzzotti et al.

(10) Patent No.: US 6,849,217 B1
(45) Date of Patent: Feb. 1, 2005

(54) PROCESS FOR PRODUCING SELF-EXTINGUISHING CABLES WITH LOW-LEVEL PRODUCTION OF FUMES, AND FLAME-RETARDANT COMPOSITIONS USED THEREIN

(75) Inventors: Franco Peruzzotti, Legnano (IT); Diego Tirelli, Sesto San Giovanni (IT); Paolo Liboi, San Donato Milanese (IT); Enrico Albizzati, Lesa (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/868,997

(22) PCT Filed: Dec. 20, 1999

(86) PCT No.: PCT/EP99/10131

§ 371 (c)(1),
(2), (4) Date: Sep. 26, 2001

(87) PCT Pub. No.: WO00/39810

PCT Pub. Date: Jul. 6, 2000

Related U.S. Application Data

(60) Provisional application No. 60/115,593, filed on Dec. 1, 1999.

(30) Foreign Application Priority Data

Dec. 24, 1998 (EP) .......................... 981 24 648

(51) Int. Cl.$^7$ ............................. B29C 47/00
(52) U.S. Cl. .................. 264/171.19; 264/211
(58) Field of Search ................ 264/171.19, 171.14, 264/171.17, 171.18, 211, 331.15

(56) References Cited

U.S. PATENT DOCUMENTS

| | | | | |
|---|---|---|---|---|
| 3,931,062 A | * | 1/1976 | Cobbledick ................ | 521/92 |
| 4,145,404 A | | 3/1979 | Miyata et al. | |
| 4,317,765 A | | 3/1982 | Gaylord | |
| 4,353,817 A | * | 10/1982 | Nakae et al. ............... | 524/232 |
| 4,554,173 A | * | 11/1985 | Fujimura et al. ........... | 427/120 |
| 4,600,806 A | * | 7/1986 | Beretta .................... | 174/121 A |
| 4,673,620 A | | 6/1987 | Shulman et al. | |
| 5,378,539 A | * | 1/1995 | Chen ......................... | 428/378 |
| 5,707,732 A | | 1/1998 | Sonoda et al. | |
| 5,716,574 A | * | 2/1998 | Kawasaki .............. | 264/171.17 |
| 6,339,189 B1 | * | 1/2002 | Caimi ......................... | 174/36 |
| 6,410,651 B1 | * | 6/2002 | Castellani et al. .......... | 525/232 |
| 6,495,760 B1 | * | 12/2002 | Castellani et al. ...... | 174/110 R |
| 6,552,112 B1 | * | 4/2003 | Redondo et al. ............ | 524/436 |
| 6,743,387 B2 | * | 6/2004 | Belli et al. ............. | 264/171.14 |
| 2002/0001715 A1 | * | 1/2002 | Redondo et al. ............ | 428/375 |
| 2002/0088642 A1 | * | 7/2002 | Caimi .................... | 174/121 A |
| 2002/0153635 A1 | * | 10/2002 | Belli et al. ................. | 264/169 |

FOREIGN PATENT DOCUMENTS

| | | |
|---|---|---|
| EP | 0 328 051 B1 | 8/1989 |
| EP | 0 530 940 A1 | 3/1993 |
| EP | 0 718 388 A | 6/1996 |
| WO | WO 83/04041 | 11/1983 |
| WO | WO 96/27885 | 9/1996 |

OTHER PUBLICATIONS

Pirelli Cavi E Sistemi S.p.A., "Low–Smoke Self–Extinguishing Electrical Cable and Flam e–Retardant Composition Used Therein", European Patent Application No. 98118194.4, Sep. 25, 1998.

Pirelli S.p.A., "Low–Smoke Self–Extinquishing Electrical Cable and Flam e–Retardant Composition Used Therein", European Patent Application No. 97121042.2, Dec. 1, 1997.

Hoshi, K., "Flame–Resistant Olefin–Based Resin Composition", Japanese Patent Office, JP Kokai No. 63–225641, Sep. 20, 1998.

Inoue, M., "Flame–Resistant Com position, and Electric W ire and Cable", Japanese Patent Office, JP Kokai No. 7–161230, Jun. 23, 1995.

Research Disclosure, "Low–Smoke Self–Extinguishing Electrical Cable and Flam e–Retardant Composition Used Therein", No. 407, pp. 245–262, Mar. 1998.

* cited by examiner

*Primary Examiner*—Mark Eashoo
(74) *Attorney, Agent, or Firm*—Finnegan, Henderson, Farabow, Garrett & Dunner, L.L.P.

(57) ABSTRACT

Process for producing cables, in particular electrical cables for low-voltage power transmission or for telecommunications, which have self-extinguishing properties and produce a low level of fumes, in which the flame-retardant coating layer is obtained by extruding a flame-retardant composition comprising a polymer base, an inorganic flame-retardant filler and a dehydrating agent. The presence of the dehydrating agent makes it possible to obtain a smooth and uniform flame-retardant layer which is virtually free of pores.

15 Claims, 1 Drawing Sheet

Figure 1:
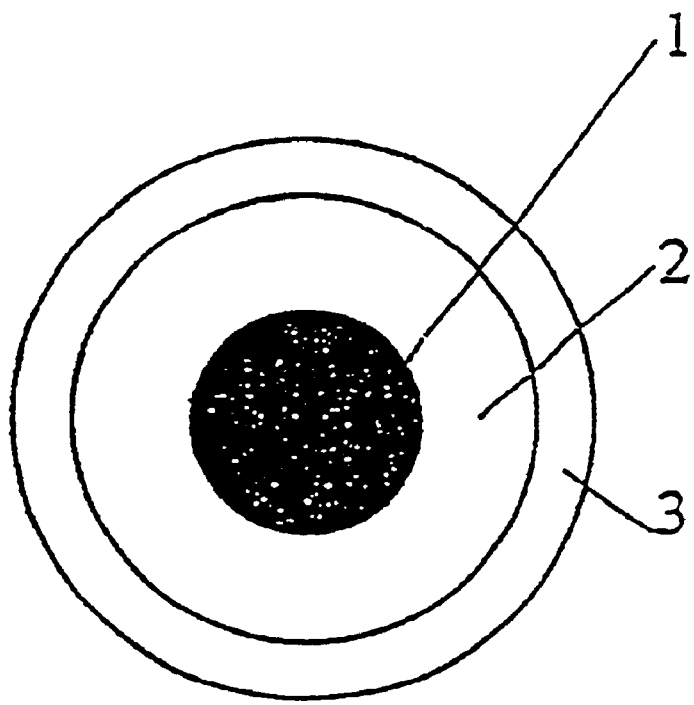

PROCESS FOR PRODUCING SELF-EXTINGUISHING CABLES WITH LOW-LEVEL PRODUCTION OF FUMES, AND FLAME-RETARDANT COMPOSITIONS USED THEREIN

This application is a national phase application of International Application No. PCT/EP99/10131, filed Dec. 20, 1999, and claims the priority of EP98124648.1, filed Dec. 24, 1998, and the benefit of U.S. Provisional application No. 60,115/593, filed Dec. 1, 1999, all of which are incorporated herein by reference.

The present invention relates to a process for producing cables, in particular electrical cables for low-voltage power transmission or for telecommunications, these cables having self-extinguishing properties and producing a low level of fumes, and to the flame-retardant compositions used therein.

Self-extinguishing cables are generally produced by extruding over the core of the cable a flame-retardant coating consisting of a polymer composition which has been given flame-resistant properties by the addition of a suitable additive. Polyolefin-based compositions based, for example, on polyethylene or ethylene/vinyl acetate copolymers, containing an organic halide combined with antimony trioxide as flame-retardant additive can, for example, be used for this purpose. However, halogenated flame-retardant additives have many drawbacks since they partially decompose during processing of the polymer, giving rise to halogenated gases that are toxic to workers and corrode the metal parts of the polymer-processing equipment. In addition, when they are placed directly in a flame, their combustion gives rise to very large amounts of fumes containing toxic gases. Similar drawbacks are encountered when polyvinyl chloride (PVC) with added antimony trioxide is used as base polymer.

Thus, in recent years, use has been made of halogen-free compounds in the production of self-extinguishing cables, in which a polymer base, generally of polyolefin type, is mixed with inorganic flame-retardant fillers, generally hydroxides, hydrated oxides or hydrated salts of metals, in particular of aluminium or magnesium, such as magnesium hydroxide or alumina trihydrate, or mixtures thereof (see, for example, patents U.S. Pat. Nos. 4,145,404, 4,673,620, EP 328,051 and EP 530,940).

The inorganic fillers can be used as they are or coated with various hydrophobic products, for example with saturated or unsaturated fatty acids or salts thereof, in particular oleic acid or stearic acid or the corresponding oleates or stearates, or with organic silanes or titanates.

For example, patent application WO 96/27885 describes a flame-retardant composition for coating electrical cables, comprising polypropylene as polymer matrix supplemented with 1–20% by weight of a polyethylene wax and 100–200% by weight of magnesium hydroxide coated with a hydrophobic product, for example an alkylsilane (% by weight relative to the weight of the polypropylene). This coating is said to increase the compatibility between the filler and the polymer matrix and at the same time to impart hydrophobic properties to the flame-retardant coating, thus avoiding the absorption of moisture which would reduce the efficiency of the insulating properties of the material.

Japanese patent application JP-07-161,230 (Kokai) describes polymer compositions with flame-retardant properties, containing appropriately ground natural magnesium hydroxide which has been surface-treated with a fatty acid or a salt thereof, or with a silane or a titanate, in amounts of between 0.5 and 5% by weight relative to the weight of the hydroxide. As described in that patent application, surface treatment of the filler is said to make it possible to reduce the released from the filler during the extrusion of the composition on the cable from effecting a kind of expansion of the material and a worsening of the surface appearance of the cable thus obtained.

The Applicant has observed that, in the production of self-extinguishing cables in which an inorganic filler as described above is used, coating of this filler with hydrophobic agents, as indicated in the prior art, is not sufficient to obtain a satisfactory result which is reproducible on an industrial scale, in particular when the process for extruding the flame-retardant composition is carried out at elevated temperatures in order to increase the fluidity and thus the processibility of the composition so as to obtain high extrusion rates and thus high productivity. Specifically, the Applicant has often observed, with flame-retardant fillers which are either coated or non-coated, and in particular with those of natural origin (i.e. obtained from minerals rather than by synthesis), the formation of a coating layer of unsatisfactory appearance, which has a dull, rough surface. In addition, in certain cases, the formation of pores inside the flame-retardant layer has been observed, with a consequent reduction in the mechanical properties of this coating.

The Applicant has now found that it is possible to obtain a self-extinguishing cable with a flame-retardant coating which is substantially free of pores and which has a smooth and uniform outer surface, if a dehydrating agent is added to the composition comprising a polymer base and an inorganic flame-retardant filler. This dehydrating agent can be added to the flame-retardant composition during the mixing (compounding) phase or directly upstream of the extruder.

In a first aspect, the present invention thus relates to a process for producing self-extinguishing cables with low-level production of fumes, which comprises:

(a) preparing a flame-retardant composition comprising a polymer base and an inorganic flame-retardant filler;

(b) extruding said flame-retardant composition on an electrical conductor, which is optionally precoated with an insulating layer, so as to obtain a flame-retardant coating layer;

characterized in that a dehydrating agent is added to said flame-retardant composition.

According to a first embodiment of the invention, the dehydrating agent is added during phase (a) of preparation of the flame-retardant composition.

In a preferred embodiment, the dehydrating agent is added during phase (a) of preparation of the flame-retardant composition after a first phase of mixing the composition at a predetermined temperature and for a predetermined time so as to reduce the moisture content present in the flame-retardant filler.

According to a further embodiment of the invention, the dehydrating agent is added during phase (b) of extrusion of the flame-retardant composition.

According to a further aspect, the present invention relates to a flame-retardant composition comprising a polymer base and an inorganic flame-retardant filler, characterized in that it also comprises a dehydrating agent.

In the Applicant's perception, the dehydrating agent exerts its action by absorbing the water present in the flame-retardant filler, which is released during the heating of the composition in the extrusion phase. The mechanism of absorption is preferably of irreversible type, or the dehydrating agent can absorb the water reversibly but with a low rate of release of the moisture at the extrusion temperature, so as to ensure the virtual absence of water in the vapour state during the extrusion phase. Working in this way prevents the formation of pores inside the flame-retardant coating and/or the appearance of roughness on its surface. The amount of water released increases as the extrusion temperature increases, as a result of which the advantages deriving from the presence of the dehydrating agents become particularly evident when relatively high extrusion temperatures, generally above 180° C., preferably above 200° C., are used.

In addition, the Applicant has found that the effect of the dehydrating agent on the surface appearance and on the mechanical properties of the flame-retardant coating is particularly evident when flame-retardant fillers of natural origin are used, for example magnesium hydroxide obtained by grinding minerals such as brucite and the like. The reason for this is thought to be that a flame-retardant filler of natural origin contains large amounts of moisture, greater than the amounts typically found in synthetic flame-retardant fillers. The moisture present can derive either from the starting mineral or from the grinding process to which this mineral is subjected, or can be absorbed from the surroundings.

Dehydrating agents which can be used are readily available inorganic compounds which are easy to handle, which do not adversely effect the mechanism of action of the flame-retardant filler and which do not produce toxic products if they are heated to high temperature or exposed to the direct action of a flame. In particular, the dehydrating agent can be chosen from: calcium oxide, calcium chloride, anhydrous alumina, zeolites, magnesium sulphate, magnesium oxide, barium oxide and the like, or mixtures thereof. Calcium oxide and zeolites, or mixtures thereof, are particularly preferred.

The amount of dehydrating agent to be added to the flame-retardant composition is mainly predetermined as a function of the nature and efficacy of this agent and on the amount of water present in the flame-retardant filler. In general, it is believed that an amount of dehydrating agent of between 0.5 and 15% by weight, preferably between 1 and 10% by weight, relative to the weight of the flame-retardant filler, is sufficient to ensure a satisfactory result.

Flame-retardant fillers which can generally be used are hydroxides, hydrated oxides, salts or hydrated salts of metals, in particular of calcium, aluminium or magnesium, such as: magnesium hydroxide, alumina trihydrate, hydrated magnesium carbonate, magnesium carbonate, hydrated calcium and magnesium carbonate, calcium and magnesium carbonate, or mixtures thereof. Magnesium hydroxide is particularly preferred, since it is characterized by a decomposition temperature of about 340° C. and thus allows high extrusion temperatures to be used. It is more particularly preferred to use magnesium hydroxide of natural origin, obtained by grinding minerals based on magnesium hydroxide, such as brucite or the like, as described in European patent application No. 97121042.2, filed on Jan. 12, 1997 by the Applicant and in the publication on Research Disclosure No. 407 (March 1998).

The flame-retardant filler is generally used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like. In order to increase the compatibility with the polymer matrix, the flame-retardant filler can likewise be surface-treated with suitable coupling agents, for example organic silanes or titanates such as vinyltriethoxysilane, vinyltriacetylsilane, tetraisopropyl titanate, tetra-n-butyl titanate and the like.

The amount of flame-retardant filler to be added is predetermined so as to obtain a cable which is capable of passing the ordinary fire-resistance tests, for example the test according to standards IEC 332-1 and IEC 332.3 A,B,C. In general, this amount is between 10 and 90% by weight, preferably between 30 and 80% by weight, relative to the total weight of the flame-retardant composition.

The polymer base can generally be chosen from: polyolefins, various olefin copolymers, copolymers of olefins with ethylenically unsaturated esters, polyesters, polyethers, polyether/polyester copolymers, and mixtures thereof.

Examples of such polymers are: high-density polyethylene (HDPE) (d=0.940–0.970 g/cm$^3$), medium-density polyethylene (MDPE) (d=0.926–0.940 g/cm$^3$), low-density polyethylene (LDPE) (d=0.910–0.926 g/cm$^3$); copolymers of ethylene with α-olefins containing from 3 to 12 carbon atoms (for example 1-butene, 1-hexene, 1-octene and the like), in particular linear low-density polyethylene (LLDPE) and ultra-low-density polyethylene (ULDPE) (d=0.860–0.910 g/cm$^3$); polypropylene (PP); thermoplastic copolymers of propylene with another olefin, in particular ethylene; copolymers of ethylene with at least one ester chosen from alkyl acrylates, alkyl methacrylates and vinyl carboxylates, in which the linear or branched alkyl group can contain from 1 to 8, preferably from 1 to 4, carbon atoms, while the linear or branched carboxylic group can contain from 2 to 8, preferably from 2 to 5, carbon atoms, in particular ethylene/vinyl acetate (EVA) copolymers; ethylene/ethyl acrylate (EEA) copolymers, ethylene/butyl acrylate (EBA) copolymers: ethylene/α-olefin rubbers, in particular ethylene/propylene rubbers (EPR), ethylene/propylene/diene rubbers (EPDM); natural rubber; butyl rubbers; and mixtures thereof.

Copolymers which are particularly preferred are those which can be obtained by copolymerization of ethylene with at least one α-olefin containing from 3 to 12 carbon atoms, and optionally with a diene, in the presence of a "single-site" catalyst, in particular a metallocene catalyst or a constrained geometry catalyst. These copolymers are characterized by a density of between 0.860 and 0.904 g/cm$^3$, preferably from 0.865 to 0.902 g/cm$^3$, and by a composition distribution index greater than 45%, said index being defined as the percentage by weight of the copolymer molecules having an α-olefin content of up to 50% of the total average molar content of α-olefin. These copolymers preferably have the following monomer composition: 75–97 mol %, preferably 90–95 mol %, of ethylene; 3–25 mol %, preferably 5–10 mol %, of α-olefin; 0–5 mol %, preferably 0–2 mol %, of a diene. The α-olefin is preferably chosen from propylene, 1-butene, 1-hexene, 1-octene and the like. Products of this type are commercially available under the tradenames Engage® from Du Pont-Dow Elastomers and Exact® from Exxon Chemical.

The ethylene copolymers obtained by single-site catalysis are preferably used as a mixture with a crystalline propylene homopolymer or copolymer, as described, for example, in the abovementioned European patent application No. 97121042.2, or with an ethylene homopolymer or copolymer which has a density of between 0.905 and 0.970 g/cm$^3$, preferably between 0.910 and 0.940 g/cm$^3$, as described, for example, in European patent application No. 98118194.4 filed on 25, Sep. 1998 in the name of the Applicant, or alternatively in U.S. Pat. No. 5,707,732. In particular, the polymer base preferably comprises from 5 to 60% by weight, more preferably from 10 to 45% by weight, of a propylene or ethylene homopolymer or copolymer as defined above, and from 40 to 95% by weight, more preferably from 55 to 90% by weight, of an ethylene copolymer obtained by single-site catalysis, the percentages being relative to the total weight of the polymeric components (a) and (b).

A coupling agent capable of increasing the interaction between the active groups of the flame-retardant filler and the polymer chains may be added to the mixture in order to enhance the compatibility between the flame-retardant filler and the polymer matrix. This coupling agent can be chosen from those known in the art, for example: saturated silane compounds or silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters.

Examples of silane compounds which are suitable for this purpose are: γ-methacryloxypropyltrimethoxysilane, allyltrimethoxysilane, allyltriethoxysilane, allylmethyldimethoxysilane, allylmethyldiethoxysilane, methyltriethoxysilane, methyltris(2-methoxyethoxy) silane, dimethyldiethoxysilane, vinyltris(2-methoxyethoxy)silane, vinyltrimethoxysilane, vinylmethyldimethoxysilane, vinyltriethoxysilane, octyltriethoxysilane, isobutyltriethoxysilane, isobutyltrimethoxysilane and the like, or mixtures thereof.

Examples of epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether and the like, or mixtures thereof.

Monocarboxylic or dicarboxylic acids, having at least one ethylenic unsaturation, or derivatives thereof, which can be used as coupling agents are, for example: maleic acid, maleic anhydride, fumaric acid, citraconic acid, itaconic acid, acrylic acid, methacrylic acid and the like, and anhydrides or esters derived from these, or mixtures thereof. Maleic anhydride is particularly preferred.

The coupling agents can be used as they are or pregrafted onto a polyolefin, for example polyethylene or copolymers of ethylene with an α-olefin, by means of a radical reaction (see for example patent EP-530,940). The amount of coupling agent grafted is generally between 0.05 and 5 parts by weight, preferably between 0.1 and 2 parts by weight, relative to 100 parts by weight of polyolefin. Polyolefins grafted with maleic anhydride are available as commercial products known, for example,. under the brand names Fusabond® (Du Pont), Orevac® (Elf Atochem), Exxelor® (Exxon Chemical), Yparex® (DSM), etc.

Alternatively, the coupling agents of carboxylic or epoxide type mentioned above (for example maleic anhydride) or the silanes with ethylenic unsaturation (for example vinyltrimethoxysilane) can be added to the mixture in combination with a radical initiator so as to graft the compatibilizing agent directly onto the polymer matrix. An organic peroxide such as tert-butyl perbenzoate, dicumyl peroxide, benzoyl peroxide, ditert-butyl peroxide and the like can, for example, be used as initiator. This method is described, for example, in patent U.S. Pat. No. 4,317,765, in Japanese patent application JP-62-58774 or alternatively in the abovementioned European patent applications Nos. 97121042.2 and 98118194.4.

The amount of coupling agent to be added to the mixture can vary mainly depending on the type of coupling agent used and on the amount of flame-retardant filler added, and is generally between 0.01 and 5%, preferably between 0.05 and 2%, by weight relative to the total weight of the base polymer mixture.

Other conventional components such as antioxidants, processing coadjuvants, lubricants, pigments, other fillers and the like can be added to the compositions according to the present invention.

Conventional antioxidants which are suitable for this purpose are, for example: polymerized trimethyldihydroquinoline, 4,4'-thiobis (3-methyl-6-tert-butyl)phenol; pentaerythryl tetra-[3-(3,5-di-tert-butyl-4-hydroxyphenyl)propionate], 2,2'-thiodiethylene bis[3-(3,5-di-tert-butyl-4-hydroxyphenyl)propionate] and the like, or mixtures thereof.

Other fillers which may be used in the present invention include, for example, glass particles, glass fibres, calcined kaolin, talc and the like, or mixtures thereof. Processing co-adjuvants usually added to the polymer base are, for example, calcium stearate, zinc stearate, stearic acid, paraffin wax, silicone rubbers and the like, or mixtures thereof.

The flame-retardant compositions according to the present invention are preferably used in non-crosslinked form, in order to obtain a coating with thermoplastic properties which is thus recyclable.

The flame-retardant compositions according to the present invention can be prepared by mixing the polymer base, the flame-retardant filler, the dehydrating agent and the other additives which may be present according to techniques known in the art, for example using an internal mixer of the type containing tangential rotors (Banbury) or interlocking rotors, or in continuous mixers of the Ko-Kneader (Buss)type or of the co-rotating or counter-rotating twin-screw type.

Preferably, the dehydrating agent is introduced after a first phase of processing the composition during which, on account of the heating generated by the compounding process, the flame-retardant filler loses a certain amount of the moisture absorbed. In this way, premature depletion of the water-absorbing capacity of the dehydrating filler is avoided, this filler needing to be active mainly during the subsequent extrusion phase. The temperature of the composition in this first compounding phase is at least 100° C., preferably at least 150° C., and is carried out for a period of at least 5 minutes.

Alternatively, rather than adding the dehydrating agent during the phase of preparation of the flame-retardant composition, it can be added during the extrusion phase, for example via the extruder hopper.

In both cases, the dehydrating agent can be added to the flame-retardant composition in divided form (granules, powder), optionally coated with dispersing and protective agents, such as microwaxes, fatty acids and the like. Alternatively, in order to improve its dispersion in the polymer base, the dehydrating agent can be used predispersed in a polymer material (for example a semi-crystalline ethylene/propylene rubber).

During the extrusion phase, the flame-retardant compositions thus obtained can be used to coat the conductor directly, or to make an outer sheath on the conductor which has been precoated with an insulating layer. When two layers are present, the extrusion can take place in two separate phases, the inner layer being extruded on the conductor in a first passage and the outer layer being extruded on the inner layer in a second passage. Advantageously, the coating process can take place in a single passage, for example by means of the "tandem" technique, in which two separate extruders arranged in series are used, or alternatively by co-extrusion with a single extrusion head.

The temperature at which the flame-retardant composition is extruded can vary within a wide range and is predetermined as a function of the extrusion rate to be obtained. The extrusion rate in fact depends on the viscosity of the composition in the molten state and thus on its temperature. In turn, the viscosity depends mainly on the type of polymer base and on the type and amount of flame-retardant filler used. The minimum extrusion temperature for the composition is generally not less than the plasticization temperature of the polymer base, while the maximum extrusion temperature is predetermined so as to avoid degradation or decomposition of the polymer base and/or of the flame-retardant filler. Thus, on the basis of the abovementioned criteria, in the case of flame-retardant compositions based on a mixture of polypropylene and ethylene/a-olefin copolymers as described above, in which magnesium hydroxide is used as flame-retardant filler, the temperature at which the flame-retardant composition is extruded is generally between 160° C. and 320° C., preferably between 200° C. and 280° C.

Although the present description is mainly directed towards the production of self-extinguishing cables by extrusion, the advantages deriving from the use of the dehydrating agent according to the present invention can be evident in different extrusion or moulding processes for the general production of rubber articles in which hygroscopic fillers are used, for example junction boxes for electrical cable junctions or terminals, in particular when high processing temperatures are required in order to obtain increased fluidity of the material to be extruded or moulded.

Some examples of embodiments will now be reported for the purpose of illustrating the present invention more clearly, with particular reference to the attached:

FIG. 1, which is a schematic drawing in cross-section of a self-extinguishing, low-voltage unipolar electrical cable which can be made according to the present invention.

The term "low-voltage" generally means a voltage of less than 2 kV, preferably less than 1 kV.

The cable in FIG. 1 comprises a conductor (1), an inner layer (2) which functions as an electrical insulator, and an outer layer (3) which functions as a protective sheath with flame-retardant properties. The inner layer (2) can consist of a crosslinked or non-crosslinked, halogen-free polymer composition with electrical insulation properties, which is known in the art, chosen, for example, from: polyolefins (homopolymers or copolymers of various olefins), olefin/ethylenically unsaturated ester copolymers, polyesters, polyethers, polyether/polyester copolymers and mixtures thereof. Examples of such polymers are: polyethylene (PE), in particular linear low-density PE (LLDPE); polypropylene (PP); propylene/ethylene thermoplastic copolymers; ethylene/propylene rubbers (EPR) or ethylene/propylene/diene rubbers (EPDM); natural rubbers; butyl rubbers; ethylene/vinyl acetate (EVA) copolymers; ethylene/methyl acrylate (EMA) copolymers; ethylene/ethyl acrylate (EEA) copolymers; ethylene/butyl acrylate (EBA) copolymers; ethylene/α-olefin copolymers, and the like.

Alternatively, a self-extinguishing cable which can be made according to the present invention can consist of a conductor coated directly with the flame-retardant composition, without interposition of other insulating layers. In this way, the flame-retardant coating also functions as an electrical insulator. A thin polymer layer which functions as an anti-abrasive agent, optionally combined with a suitable pigment in order to give a coloration for identification purposes, can then be added externally.

Preparation of the Flame-retardant Compositions

The flame-retardant compositions were prepared in a closed Banbury mixer (mixing chamber volume: 1200 cm$^3$) filled to a volumetric level of 95%. The mixing was carried out in two phases. In the first phase, the components of the compound, with the exception of the dehydrating agent, were mixed together until a temperature of about 200° C. was reached, so as to ensure good dispersion of the components and to reduce the amount of moisture present in the filler. The dehydrating agent was then added, while keeping the mixing temperature at about 200° C.

Mechanical Properties

Self-extinguishing cables were produced by extruding the compositions prepared as described above on a wire of red copper (cross-section 2.5 mm$^2$) in an extruder with a cylinder 120 mm in diameter and with a length equal to 25 diameters (final thickness of the flame-retardant layer: 0.8 mm). The temperature of the composition in the extruder was kept at about 250° C., with an extrusion rate of 900 m/min.

The flame-retardant coatings thus obtained were subjected to mechanical tensile strength tests according to CEI standard 20-34 § 5.1. The results are given in Table 1, as the average value obtained over five samples taken at random from each cable produced. All of the cables produced passed the flame-resistance test according to IEC standard 332-1, which consists in subjecting a 60 cm long sample, placed vertically, to the direct action of a Bunsen-burner flame applied for 1 min at an angle of 45° relative to the sample.

TABLE 1

| Example | 1 | 2 | 3 | 4 (*) | 5 | 6 (*) |
|---|---|---|---|---|---|---|
| Engage ® 8003 | 85 | 85 | 85 | 85 | 85 | 85 |
| Moplen ® EP1X35HF | 15 | 15 | 15 | 15 | 15 | 15 |
| Hydrofy ® G 1.5 | 210 | 210 | 210 | 210 | — | — |
| Hydrofy ® G 1.5S | — | — | — | — | 210 | 210 |
| Peroximon ® DC40 | 0.4 | 0.4 | 0.4 | 0.4 | 0.4 | 0.4 |
| Silquest ® A-172 | 1.8 | 1.8 | 1.8 | 1.8 | 1.8 | 1.8 |
| Irganox ® 1010 | 0.8 | 0.8 | 0.8 | 0.8 | 0.8 | 0.8 |
| Irganox ® MD1024 | 0.3 | 0.3 | 0.3 | 0.3 | 0.3 | 0.3 |
| Stearic acid | 1.5 | 1.5 | 1.5 | 1.5 | 1.5 | 1.5 |
| Kezadol ® GR | 2 | 6 | 10 | — | 6 | — |
| Mechanical properties on cable extruded at 900 m/min | | | | | | |
| Breaking load (MPa) | 14.0 | 13.8 | 12.2 | 14.2 | 13.5 | 13.0 |
| Elongation at break (%) | 122 | 140 | 159 | 90 | 157 | 105 |

(*) comparative

Engage® 8003—ethylene/1-octene copolymer obtained by metallocene catalysis: ethylene/1-octene weight ratio=82/18 (5.5 mol % of 1-octene); d=0.885 g/cm$^3$; MFI=1.0 g/10'; CDI>70%; $\Delta H_{2f}$=55.6 J/g;

Moplen® EP1X35HF—random crystalline propylene/ethylene copolymer: d=0.900 g/cm$^3$; MFI=9.0 g/10'; $T_{2f}$=154° C.; $\Delta H_{2f}$=90.6 J/g;

Hydrofy® G 1.5—natural magnesium hydroxide, obtained by grinding brucite, not surface-treated (SIMA company) with specific surface area: 10.4 m$^2$/g;

Hydrofy® G 1.5S—natural magnesium hydroxide, obtained by grinding brucite, surface-treated with stearic acid (SIMA company) with specific surface area: 10.4 m$^2$/g;

Silquest® A-172—coupling agent: vinyltris(2-methoxyethoxy)silane (VTMOEO);
Peroximon® DC40—peroxidic initiator: dicumyl peroxide;
Irganox® 1010—antioxidant: pentaerythryl tetrakis[3-(3,5-di-tert-butyl-4-hydroxyphenyl)propionate](Ciba-Geigy);
Irganox® MD1024—metal deactivator: 1,2-bis(3,5-di-tert-butyl-4-hydroxyhydrocinnamoyl)hydrazine (Ciba-Geigy);
Kezadol® GR—calcium oxide predispersed in semicrystalline EPR rubber (80% by weight of CaO), in the form of granules with average diameter 6–7 μm (Kettlitz company).

The results given in Table 1 demonstrate clearly that in the cables produced in the presence of calcium oxide, the flame-retardant coating has excellent mechanical properties. In contrast, the comparative cables, produced without dehydrating agent, show unsatisfactory mechanical properties and are not capable of passing the specifications required for cables of this type (usually a breaking load greater than 12.5 MPa and an elongation at break greater than 125%). Under visual examination, the comparative cables show a dull surface with the presence of micropores inside the flame-retardant coating, these defects being entirely absent from the cables produced according to the invention.

What is claimed is:

1. Process for producing self-extinguishing cables with low-level production of fumes, which comprises:
   (a) preparing a flame-retardant composition comprising a polymer base and an inorganic flame-retardant filler, wherein the polymer base and the inorganic flame-retardant filler are mixed at a predetermined temperature for a predetermined time so as to reduce moisture contained in the inorganic flame-retardant filler, and then a dehydrating agent is added to the resulting composition;
   (b) extruding said flame-retardant composition on an electrical conductor, which is optionally precoated with an insulating layer, so as to obtain a flame-retardant coating.

2. Process according to claim 1, in which the dehydrating agent is added during phase (a) of preparation of the flame-retardant composition.

3. Process according to claim 1, in which the dehydrating agent is added to the flame-retardant composition in divided form.

4. Process according to claim 1, in which the dehydrating agent is added to the flame-retardant composition after first being dispersed in a polymer material.

5. Process according to claim 1, in which the flame-retardant composition is extruded at a predetermined temperature which depends on the extrusion rate to be obtained.

6. Process according to claim 5, in which the flame-retardant composition is extruded at a temperature of between 160° C. and 320° C.

7. Process according to claim 6, in which the flame-retardant composition is extruded at a temperature of between 200° C. and 280° C.

8. Process according to claim 1, in which the dehydrating agent is chosen from: calcium oxide, calcium chloride, anhydrous alumina, zeolites, magnesium sulphate, magnesium oxide, barium oxide, the like, and mixtures thereof.

9. Process according to claim 8, in which the dehydrating agent is chosen from: calcium oxides, zeolites, and mixtures thereof.

10. Process according to claim 1, in which the dehydrating agent is added to the flame-retardant composition in an amount of between 0.5 and 15% by weight relative to the weight of the flame-retardant filler.

11. Process according to claim 10, in which the dehydrating agent is added to the flame-retardant composition in an amount of between 1 and 10% by weight relative to the weight of the flame-retardant filler.

12. Process according to claim 1, in which the flame-retardant filler is chosen from: hydroxides, hydrated oxides, salts, and hydrated salts of metals.

13. Process according to claim 12, in which the flame-retardant filler is chosen from: magnesium hydroxide, alumina trihydrate, hydrated magnesium carbonate, magnesium carbonate, hydrated calcium and magnesium carbonate, calcium and magnesium carbonate, and mixtures thereof.

14. Process according to claim 13, in which the flame-retardant filler is magnesium hydroxide.

15. Process according to claim 13, in which the flame-retardant filler is magnesium hydroxide of natural origin.

* * * * *